Patented Mar. 15, 1938

2,111,460

UNITED STATES PATENT OFFICE 2,111,460

ALKALI METAL TITANATES

Joachim Rockstroh, Cologne-Deutz, Germany, assignor, by mesne assignments, to National Lead Company, New York, N. Y., a corporation of New Jersey No Drawing. Application July 14, 1934, Serial No. 735,289. In Germany August 22, 1933

7 Claims. (Cl. 23—51)

This invention relates to the manufacture of alkali metal titanates by heating titanium oxygen compounds with alkalies, more particularly it relates to subjecting dry and pulverized mixtures of titanium oxygen compounds and alkalies to heat treatment below the melting point of the alkali employed.

Alkali metal titanates may be produced by heating titanium dioxide with alkali metal hydroxides or alkali metal carbonates to temperatures of 600–700° C. It is known that the manufacture of alkali metal titanates can also be performed at lower temperatures of 80–200° C., if hydrated titanium oxygen compounds are heated with alkalies. In this process a paste made of hydrated titanic acid and water and containing 30% of $TiO_2$ is produced, the mixture is treated with the necessary quantity of alkali metal carbonate or hydroxide and heated to a temperature of between 80 and 200° C. The water thereby evaporates. The products thus obtained always contain alkali metal sulfates because the hydrated meta titanic acids obtained from titanium sulfate solutions by the known methods always contain some sulfate.

In accordance with the present invention it has been found that the formation of alkali metal titanates readily occurs on intimately mixing dry titanic acid and solid alkali metal hydroxide or oxide and heating the mixture to a temperature of about 150–220° C. This process offers many advantages because no evaporation of a large quantity of water necessary for carrying out the process in accordance with the known methods takes place. Thus no waste of energy occurs. Further, it is known that an aqueous paste of titanic acid hydrate and alkali metal hydroxide on heating and drying tends to spray and thereby endangers the workmen. This disadvantage is overcome by the new process.

Further, it has been found that not only dried titanic acid without the addition of water reacts with alkali metal hydroxide at moderately high temperatures with the formation of alkali metal titanates, but also that calcined titanium dioxide can be converted into alkali metal titanate in the same manner. This is surprising since, as is known, the reactivity of titanic acid is greatly reduced by calcining. A great advantage of the new process is to be seen therein that it becomes possible to use titanium dioxide which by calcining has been completely liberated from sulfuric acid, so that titanates free from alkali metal sulfate can be produced. This is of especial advantage if the alkali metal titanate is to be employed for the manufacture of other titanium compounds, for instance, organic titanium compounds, since contaminations of these compounds, for instance of alkali metal titanium oxalic acid solutions with alkali metal sulfate, are thus avoided.

The process can be carried out in such a manner that dried meta titanic acid or calcined titanium dioxide is intimately mixed with dry powdery alkali metal hydroxide or oxide and is heated to the appropriate temperature in a reaction vessel suitable for this purpose, for instance, in an iron pan which may be provided with a stirrer. The temperature most favorable for carrying out the process is from about 150° to about 220° C., but also lower or higher temperatures up to below the melting point of the alkali metal hydroxide or oxide may be employed. The higher the temperature the more rapidly the reaction is complete and the higher rises the content of titanium of the product within certain ranges, since the technical alkali metal hydroxide or oxide always contains a certain quantity of water which evaporates during the heating process. Besides this, the quantity of water formed according to the equation $$TiO_2 + 2KOH = K_2TiO_3 + H_2O$$

must be taken into consideration. The alkali metal hydroxide or oxide may be applied in such quantities that meta titanates of the formula $Me_2TiO_3$ are formed. But also smaller quantities of alkali may be applied so that products of a higher $TiO_2$ content are formed. When producing sodium titanate a slight excess of sodium hydroxide or oxide is preferred since, as is known, the action of sodium hydroxide on titanium oxygen compounds is not as strong as the action of potassium hydroxide or oxide on titanium oxygen compounds. In the same manner also caesium, rubidium and lithium titanates may be produced. After the heat treatment the product may be ground with or without additions or it may be used directly for the manufacture of other titanium compounds.

The invention is further illustrated by the following example:

Example.—500 parts by weight of titanium dioxide, produced from hydrolytically precipitated meta titanic acid by heating for one hour to 950° C. and which contains no sulfate, are intimately mixed with 750 parts by weight of technical, powdery potassium hydroxide and heated in a drier for about three quarters of an hour to 160–170° C. The white product consists of $K_2TiO_3$ which is soluble in cold hydrochloric acid and contains a small amount of insoluble residue ($TiO_2$). It is free from sulfate.

The expressions "oxygen compound of titanium" and "oxygen compound of an alkali metal" used in the claims are intended to comprise the oxides as well as the hydroxides of titanium and the alkali metals.

I claim:—

1. The process of preparing an alkali metal titanate, which comprises intimately mixing a dry and pulverized artificially prepared titanium-oxygen compound with a dry and pulverized oxygen compound of an alkali metal and heating the mixture so obtained to a temperature of about 150° C. to 220° C. until formation of alkali metal titanate is substantially complete.

2. The process of preparing an alkali metal titanate, which comprises intimately mixing dry and pulverized artificially prepared titanium dioxide with a dry and pulverized oxygen compound of an alkali metal and heating the mixture so obtained to a temperature of about 150° C. to 220° C. until formation of alkali metal titanate is substantially complete.

3. The process of preparing an alkali metal titanate which comprises intimately mixing dry and pulverized artificially prepared meta-titanic acid with a dry and pulverized oxygen compound of an alkali metal and heating the mixture so obtained at temperatures between about 150° C. and 220° C. until formation of the alkali titanate is substantially complete.

4. The process of preparing an alkali metal titanate which comprises intimately mixing dry and pulverized artificially prepared titanium dioxide with dry and pulverized potassium hydroxide and heating the mixture so obtained at temperatures between about 150° C. and 220° C. until formation of the alkali titanate is substantially complete.

5. The process of preparing an alkali metal titanate which comprises intimately mixing dry and pulverized artificially prepared meta-titanic acid with dry and pulverized potassium hydroxide and heating the mixture so obtained at temperatures between about 150° C. and 220° C. until formation of the alkali titanate is substantially complete.

6. The process of preparing an alkali metal titanate which comprises intimately mixing dry and pulverized artificially prepared titanium dioxide with dry and pulverized sodium hydroxide and heating the mixture so obtained at temperatures between about 150° C. and 220° C. until formation of the alkali titanate is substantially complete.

7. The process of preparing an alkali metal titanate which comprises intimately mixing dry and pulverized artificially prepared meta-titanic acid with dry and pulverized sodium hydroxide and heating the mixture so obtained at temperatures between about 150° C. and 220° C. until formation of the alkali titanate is substantially complete.

JOACHIM ROCKSTROH.